US010013900B2

(12) United States Patent
Beckman

(10) Patent No.: US 10,013,900 B2
(45) Date of Patent: Jul. 3, 2018

(54) VEHICLE NOISE CONTROL AND COMMUNICATION

(71) Applicant: Amazon Technologies, Inc., Seattle, WA (US)

(72) Inventor: Brian C. Beckman, Newcastle, WA (US)

(73) Assignee: Amazon Technologies, Inc., Seattle, WA (US)

(*) Notice: Subject to any disclaimer, the term of this patent is extended or adjusted under 35 U.S.C. 154(b) by 837 days.

(21) Appl. No.: 14/494,032

(22) Filed: Sep. 23, 2014

(65) Prior Publication Data

US 2016/0083073 A1 Mar. 24, 2016

(51) Int. Cl.
*G09F 13/00* (2006.01)
*G09F 9/33* (2006.01)
*G10K 11/178* (2006.01)

(52) U.S. Cl.
CPC .............. *G09F 13/00* (2013.01); *G09F 9/33* (2013.01); *G10K 11/178* (2013.01); *B64C 2201/027* (2013.01); *B64C 2220/00* (2013.01); *G10K 2210/123* (2013.01); *G10K 2210/1281* (2013.01)

(58) Field of Classification Search
CPC ............ B64C 2220/00; B64C 2230/14; F05D 2260/961; F05D 2260/962; F02C 7/045; G10K 2210/123; G10K 2210/1281
See application file for complete search history.

(56) References Cited

U.S. PATENT DOCUMENTS

| 1,585,218 | A | | 5/1926 | Watanabe | |
|---|---|---|---|---|---|
| 4,453,163 | A | * | 6/1984 | Garner | G01D 7/00 340/971 |
| 4,483,658 | A | * | 11/1984 | Levine | F04D 29/325 416/127 |
| 4,883,240 | A | * | 11/1989 | Adamson | B64C 11/00 244/1 R |
| 4,947,356 | A | | 8/1990 | Elliott et al. | |
| 5,148,402 | A | * | 9/1992 | Magliozzi | B64C 11/50 244/1 N |
| 5,190,441 | A | * | 3/1993 | Murphy | B64C 11/008 415/119 |

(Continued)

FOREIGN PATENT DOCUMENTS

| DE | 102011011489 A1 * | 8/2012 | ............ B64C 11/18 |
|---|---|---|---|
| WO | 94/09483 | 4/1994 | |

OTHER PUBLICATIONS

The PCT Search Report and Written Opinion dated Feb. 17, 2016 for PCT application No. PCT/US2015/051225, 19 pages.

(Continued)

*Primary Examiner* — Benjamin P Lee
(74) *Attorney, Agent, or Firm* — Lee & Hayes, PLLC

(57) ABSTRACT

This disclosure is directed to an automated aerial vehicle ("AAV") and systems, devices, and techniques pertaining to canceling noise, generating audible communications, and/or generating visible communications. The AAV may include one or more propellers utilized, in part, to produce sound that cancels noise generated by one or more other propellers. Additionally or alternatively, the AAV may utilize one or more propellers to generate audible and/or visible communications.

20 Claims, 9 Drawing Sheets

(56) References Cited

U.S. PATENT DOCUMENTS

| | | | | |
|---|---|---|---|---|
| 5,453,943 | A * | 9/1995 | Magliozzi | G10K 11/175 244/1 N |
| 5,692,054 | A * | 11/1997 | Parrella | F04D 29/665 381/71.3 |
| 5,789,678 | A * | 8/1998 | Pla | B64C 11/50 244/1 N |
| 7,271,813 | B2 * | 9/2007 | Gilbert | B60K 35/00 345/619 |
| 7,383,106 | B1 * | 6/2008 | Coonse, Jr. | G10K 11/1784 381/367 |
| 8,218,781 | B1 * | 7/2012 | Swanke | G10K 11/1788 318/41 |
| 8,233,644 | B2 * | 7/2012 | DeMoss | G06F 1/20 361/688 |
| 8,348,712 | B2 * | 1/2013 | De La Torre | A63H 27/12 446/175 |
| 8,382,430 | B2 * | 2/2013 | Parry | B64C 11/48 416/1 |
| 8,661,781 | B2 * | 3/2014 | Moore | B64C 11/48 244/17.23 |
| 8,740,133 | B2 * | 6/2014 | Saucray | B64C 11/008 244/1 N |
| 8,951,012 | B1 * | 2/2015 | Santoro | F04D 19/024 416/124 |
| 9,489,937 | B1 * | 11/2016 | Beard | G10K 11/1782 |
| 9,637,221 | B2 * | 5/2017 | Moore | B64C 11/003 |
| 9,646,597 | B1 * | 5/2017 | Beckman | G10K 11/1782 |
| 2006/0284736 | A1 * | 12/2006 | Low | B64D 43/00 340/980 |
| 2007/0200027 | A1 | 8/2007 | Johnson | |
| 2011/0198440 | A1 * | 8/2011 | Saucray | B64D 31/12 244/69 |
| 2012/0025016 | A1 * | 2/2012 | Methven | B64C 11/00 244/1 N |

OTHER PUBLICATIONS

Klapel, "Acoustic Measurements with a Quadcopter—Embedded System Implementations for Recording Audio from Above", retrieved on Nov. 23, 2015 at «http://www.diva-portal.org/smash/get/diva2:745626/FULLTEXT01.pdf», NTNU—Trondheim, Norwegian University of Science and Technology, Jun. 30, 2014, 123 pages.

PCT Invitation to Pay Additional Fees dated Dec. 11, 2015 for PCT Application No. PCT/US15/051225, 8 pages.

* cited by examiner

VEHICLE NOISE CONTROL AND COMMUNICATION

BACKGROUND

Automated aerial vehicles, sometimes referred to as drones or unmanned aerial vehicles (UAVs), have become commonly used by hobbyists, some commercial entities, and various militaries. Many of these aerial vehicles are used for capturing aerial images; however, other uses exist. Despite offering numerous applications, aerial vehicles present various challenges with respect to noise control and communication.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
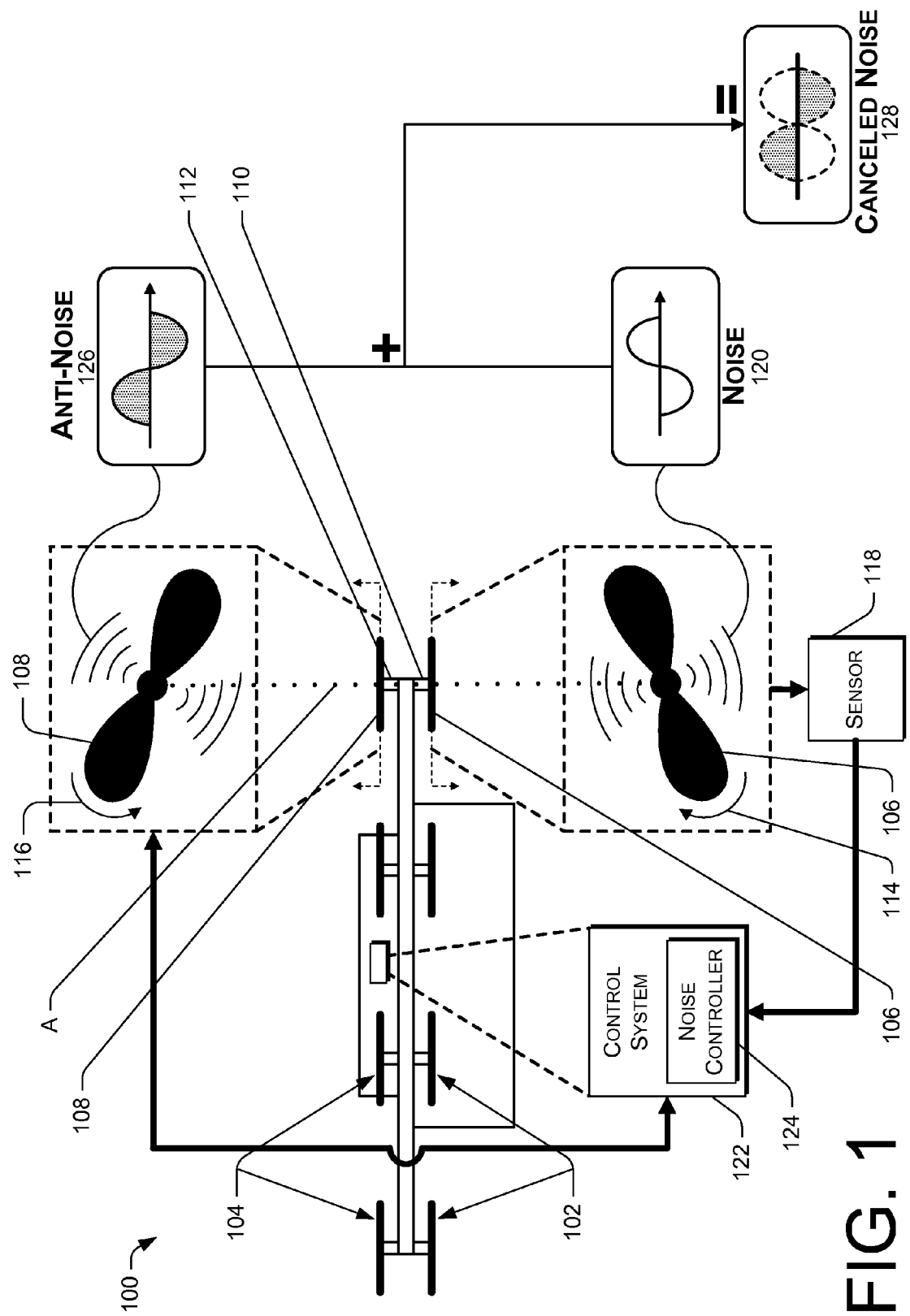
FIG. 1 is an illustrative diagram of an example automated aerial vehicle (AAV) that includes components used to implement noise cancellation, in accordance with some implementations.

This disclosure is directed to an automated aerial vehicle ("AAV") and systems, methods, and techniques pertaining to canceling noise generated by the AAV. This disclosure is also directed to systems, methods, and techniques for generating audible and visible signals/communications/announcements via the AAV. While various aspects are described with reference to AAVs, it should be understood that this disclosure includes any type of vehicle suitable for use with the systems, methods, and techniques described herein. For example, any other type of aircraft (e.g., a passenger airplane), any type of land craft (e.g., an automobile), or any type of watercraft (e.g., a motor boat), may be used with the systems, methods, and techniques described in this disclosure.

In some implementations, the AAV may include multiple propellers (also called rotors). For instance, the AAV may include a first propeller operable to rotate in a first rotational direction to cause lift and thrust of the AAV. The AAV may also include a second propeller operable to rotate in a second rotational direction that is opposite the first rotational direction. That is, in some cases the first propeller may rotate counter-clockwise and the second propeller may rotate clockwise. In other cases, the first propeller may rotate clockwise and the second propeller may rotate counter-clockwise. In yet other cases, an AAV controller or an operator of the AAV may be capable of selectively changing the rotational direction of the first propeller, the second propeller, or both.

While the second propeller may cause lift of the AAV, the second propeller may also be operable to produce sound that cancels noise generated by the first propeller. In some cases, an audio sensor (e.g., a microphone) located near the first propeller may detect the noise generated by the first propeller. A controller may be in direct or indirect communication with the audio sensor. The controller may be configured to receive a signal representing the noise detected by the audio sensor. The controller may also be in direct or indirect communication with the second propeller, and may cause the second propeller to produce anti-noise sound that cancels the noise generated by the first propeller.

In a particular embodiment, the first propeller and the second propeller may be arranged in a vertically stacked configuration. For example, the second propeller may be located above the first propeller. The second propeller may also be coaxial with the first propeller. A microphone may be located below the first propeller to detect the noise generated by the first propeller while the first propeller is rotating in a first rotational direction. A controller may be in direct or indirect communication with at least the microphone and a motor that drives rotation of the second rotor. The controller may receive an input signal from the microphone representing the noise generated by the first propeller. The controller may output an anti-noise signal (e.g., a signal based at least in part on phase shifting the received input signal) to the motor that causes the motor to modulate rotational speed of the second propeller. While rotating at the modulated rotational speed, the second propeller may generate anti-noise that cancels the noise generated by the first propeller.

Additionally or alternatively, in some implementations, the AAV may utilize one or multiple propellers for generating audible communications. For example, a controller of the AAV may receive various parameters as input. Based at least partly on a received input parameter, the controller may determine that a flight condition is satisfied. The flight condition may, for example, correspond to an audible communication that is to be communicated.

Suppose, for instance, that the AAV were delivering an inventory item to a location. Upon approaching the location, the AAV determines (e.g., based on a video signal fed as an input parameter to the controller via a camera) that a person is situated at or near an intended or a suitable landing area corresponding to the delivery location. Such an input parameter may satisfy a flight condition corresponding to an audible communication, such as a "Watch out!" warning message. Accordingly, the controller may determine and cause to implement modulations of the rotational speed of a propeller, thereby causing the propeller to produce a series of sounds that are audibly perceptible as "Watch out!"

Additionally or alternatively, in some implementations, the AAV may utilize one or multiple propellers for generating visible communications. For example, a controller of the AAV may receive various parameters as input. Based at least partly on a received input parameter, the controller may determine that a flight condition is satisfied. The flight condition may, for example, correspond to a visible communication that is to be communicated.

Suppose now that the controller of the AAV were to receive an input parameter satisfying a flight condition corresponding to a visible communication, such as a "HELLO" greeting message to be communicated to a person situated at or near the delivery location. To generate the visible communication, light sources [e.g., light-emitting diodes (LEDs)] coupled to one or multiple propellers may be caused to intermittently emit light in a synchronized manner while the propellers are rotating to generate patterns that are visibly perceptible as "HELLO."

In some cases, the visible communications may include multiple words that together form phrases or sentences. Individual propellers may generate one or more of: a single letter or symbol of the visible communication, multiple letters of the visible communication, multiple symbols of the visible communication, etc. Multiple propellers may cooperatively generate one or more of: a single letter or symbol of the visible communication, multiple letters of the visible communication, multiple symbols of the visible communication, etc. It should be understood, however, that the propellers in conjunction with the light sources coupled thereto may be caused to generate a visible communication in any suitable manner.

The AAV may be implemented as virtually any type of aircraft. In some embodiments, the AAV may be a multi-rotor vertical takeoff and landing vehicle, such as a quadcopter, octocopter, or other multi-rotor aerial vehicle. In various embodiments, the AAV may include at least one fixed wing to provide at least some upward lift during forward flight of the AAV. The AAV may be configured to transition from rotor flight to a fixed-wing flight during operation, such as by redirecting rotors/propellers from a lift configuration to a forward propulsion configuration when the AAV includes at least one wing that provides upward lift.

FIG. 1 is an illustrative diagram of an example automated aerial vehicle (AAV) 100 that includes components used to implement noise cancellation, in accordance with some implementations. The AAV 100 may include a first set of propellers 102 and a second set of propellers 104. The propellers 102 and 104 may be any form of propeller (e.g., graphite, carbon fiber) and of a size sufficient to lift the AAV 100 and any inventory/payload engaged by the AAV 100 so that the AAV 100 can navigate through the air, for example, to deliver an inventory item to a location/destination. While FIG. 1 shows eight propellers visible from a side of the AAV 100, in other implementations, more or fewer propellers may be utilized. Likewise, in some implementations, the propellers may be positioned at different locations on the AAV 100. In addition, alternative methods of upward or forward propulsion may be utilized. For example, fans, jets, turbojets, turbo fans, jet engines, and the like may be used to propel the AAV 100.

The first set of propellers 102 may include a lower propeller 106, and the second set of propellers 104 may include an upper propeller 108. For clarity, the following discussion with respect to FIG. 1 refers primarily to the lower propeller 106 and the upper propeller 108, but it should be understood that the corresponding description may similarly be implemented with respect to one or various combinations of multiple propellers of the AAV 100. In some instances, the lower propeller 106 and the upper propeller 108 may be arranged in a vertically stacked configuration. For example, the upper propeller 108 may be disposed above the lower propeller 106. Additionally, the upper propeller 108 may be oriented substantially coaxial with the lower propeller 106. That is, the central axis about which the upper propeller 108 rotates may be aligned with or approximately aligned with the central axis about which the lower propeller 106 rotates, as indicated in FIG. 1 by the dotted line A.

In various implementations, the AAV 100 may include a lower motor 110. The lower motor 110 may drive rotation of the lower propeller 106. Likewise, the AAV 100 may include an upper motor 112 that drives rotation of the upper propeller 108. Although FIG. 1 shows the lower propeller 106 and the upper propeller 108 each being coupled to an individual motor, it should be understood that in some implementations a same motor may drive multiple propellers (e.g., via a transmission system). In other implementations, multiple motors may drive an individual propeller.

The lower propeller 106 and the upper propeller 108 may rotate at independently varying rotational speeds. For example, during various stages of flight of the AAV 100, the lower motor 110 and the upper motor 112 may cause the lower propeller 106 and the upper propeller 108, respectively, to rotate at rotational speeds ranging from approximately 2000 RPM to approximately 3000 RPM to provide the AAV 100 with lift and thrust suitable for conditions (e.g., weather conditions) under which the AAV 100 is flying.

While rotating, the propellers of the AAV 100 may generate noise. In some implementations, one or multiple propellers of the AAV 100 may be operable to produce sound that cancels noise generated at least partly by one or multiple other propellers of the AAV 100. In some instances, the lower propeller 106 may be operable to rotate in a first rotational direction 114, and the upper propeller 108 may be operable to rotate in a second rotational direction 116 that is opposite the first rotational direction 114. As depicted in FIG. 1, the lower propeller 106 rotates in a first rotational direction 114 corresponding to a clockwise direction and the upper propeller 108 rotates in a second rotational direction 116 corresponding to a counter-clockwise direction. However, it should be understood that in various implementations the lower propeller 106 may rotate in a counter-clockwise direction and the upper propeller 108 may rotate in a clockwise direction. In some cases, a controller of the AAV 100 or an operator of the AAV 100 may be capable of selectively changing the rotational direction of the lower propeller 106, the upper propeller 108, or both.

In some cases, a sensor 118 may be disposed proximate the lower propeller 106. In some implementations, the sensor 118 may be located below the lower propeller 106. But in other implementations, the sensor 118 may be disposed in any other suitable location.

The sensor 118 may be configured to sense/detect/measure the noise 120 generated by the lower propeller 106. For example, the sensor 118 may be an audio sensor such as a microphone. However, the sensor 118 may be any type of sensor suitable for directly or indirectly sensing/detecting/measuring an operational characteristic or parameter associated with the lower propeller 106 that may be interpreted as a representation of the noise 120 generated by the lower propeller 106. For example, the sensor 118 may additionally or alternatively be configured to detect rotational speed of the lower propeller 106, rotational speed of the lower motor 110, etc. Although FIG. 1 shows an individual sensor 118, multiple sensors may be used to detect noise generated by an individual propeller, by multiple propellers, in the ambient environment, etc.

In various implementations, the AAV 100 may include one or multiple control systems 122 in direct or indirect communication with the sensor 118. For example, the control systems 122 may include a noise controller 124 in direct or indirect communication with the sensor 118. The noise controller 124 may be configured to control the perceptible noise level of one or multiple types of noise-generating mechanisms of the AAV 100. In some cases, the noise controller 124 may be dedicated to controlling the cancellation of noise generated by one or multiple propellers.

Some implementations (e.g., as illustrated in FIG. 1) may involve the noise controller 124 controlling the cancellation of noise 120 generated by the lower propeller 106. The noise controller 124 may receive from the sensor 118 an input signal representing the noise 120 generated by the lower propeller 106. The noise controller 124 may interpret the received input signal and, based at least in part on the interpretation, send to the upper motor 108 an output signal that causes the upper propeller 108 to produce sound 126 that destructively interferes with the noise 120 generated by the lower propeller 106, resulting in canceled noise 128. For example, the output signal may cause the upper motor 112 to modulate rotational speed of the upper propeller 108 such that the upper propeller 108, while rotating at the modulated rotational speed, produces anti-noise 126 that destructively interferes with and cancels or substantially cancels the noise 120 generated by the lower propeller 106.

In various implementations, the anti-noise 126 generated by the upper propeller 108 may be anti-noise sound waves 126 having approximately the same frequency and amplitude as the noise sound waves 120 generated by the lower propeller 106. However, the anti-noise sound waves 126 may be in anti-phase with the noise sound waves 120. That is, in some implementations, the anti-noise sound waves 126 and the noise sound waves 120 may have a phase difference of approximately 180 degrees. Additionally or alternatively, some implementations may involve the noise controller 124 causing the upper propeller 108 to generate sound waves that have a phase difference other than approximately 180 degrees to, for example, reinforce or weaken the sound waves generated by the lower propeller 106.

The noise controller 124 may also receive as an input signal a representation of rotational speed of the upper propeller 108. In some instances, the noise controller 124 may determine an output signal based at least in part on the received input signals representing each of the noise 120 generated by the lower propeller 106 and the rotational speed of the upper propeller 108. For instance, the noise controller 124 may determine the rotational speed of the upper propeller 108 and, based on prior modeling, utilize the determined rotational speed to determine various characteristics (e.g., frequency, amplitude, phase, etc.) of the sound waves being produced by the upper propeller 108. The noise controller 124 may compare the determined characteristics corresponding to the sound waves of the upper propeller 108 to the respective characteristics of the noise sound waves 120 corresponding to the lower propeller 106 as determined, for example, based on the received input signal representing the noise 120 generated by the lower propeller 106. The noise controller 124 may determine how the rotational speed of the upper propeller 108 is to be modulated to cause the upper propeller 108 to produce anti-noise 126 that will substantially cancel the noise 120 generated by the lower propeller 106.

In some implementations, the rotational speed of the upper propeller 108 may be modulated at a rate ranging from about 9 kHz to about 11 kHz. For instance, in some implementations, the rate of modulation of the rotational speed of the upper propeller 108 may be approximately 10 kHz. In some cases, the lower propeller 106 may be the primary thrust generator with respect to the thrust generated by the upper propeller 108. The upper propeller 108, also capable of generating thrust, may modulate its thrust at a high frequency that corresponds to the rate of modulation of the rotational speed of the upper propeller 108.

In a non-limiting example scenario, at a first time the upper propeller 108 rotates at a rotational speed of about 2500 RPM. The rotational speed of the upper propeller 108 may be modulated or adjusted at a rate of about 10 kHz. That is, the rotational speed of the upper propeller 108 may be modulated or adjusted at a rate of about 10000 times per second to cancel the noise 120 generated by the lower propeller 106. In this example, the rotational speed of the upper propeller 108 may be modulated at a second time to about 2503 RPM, then modulated at a third time to about 2498 RPM, then modulated at a fourth time to about 2507 RPM, and so on, where the second, third, and fourth times are three of about 10000 modulations that occur within the span of a second, i.e., a rate of modulation of about 10 kHz. In this manner, the rotational speed of the upper propeller 108 may be incrementally modulated at a high frequency in some implementations.

Figure 2:
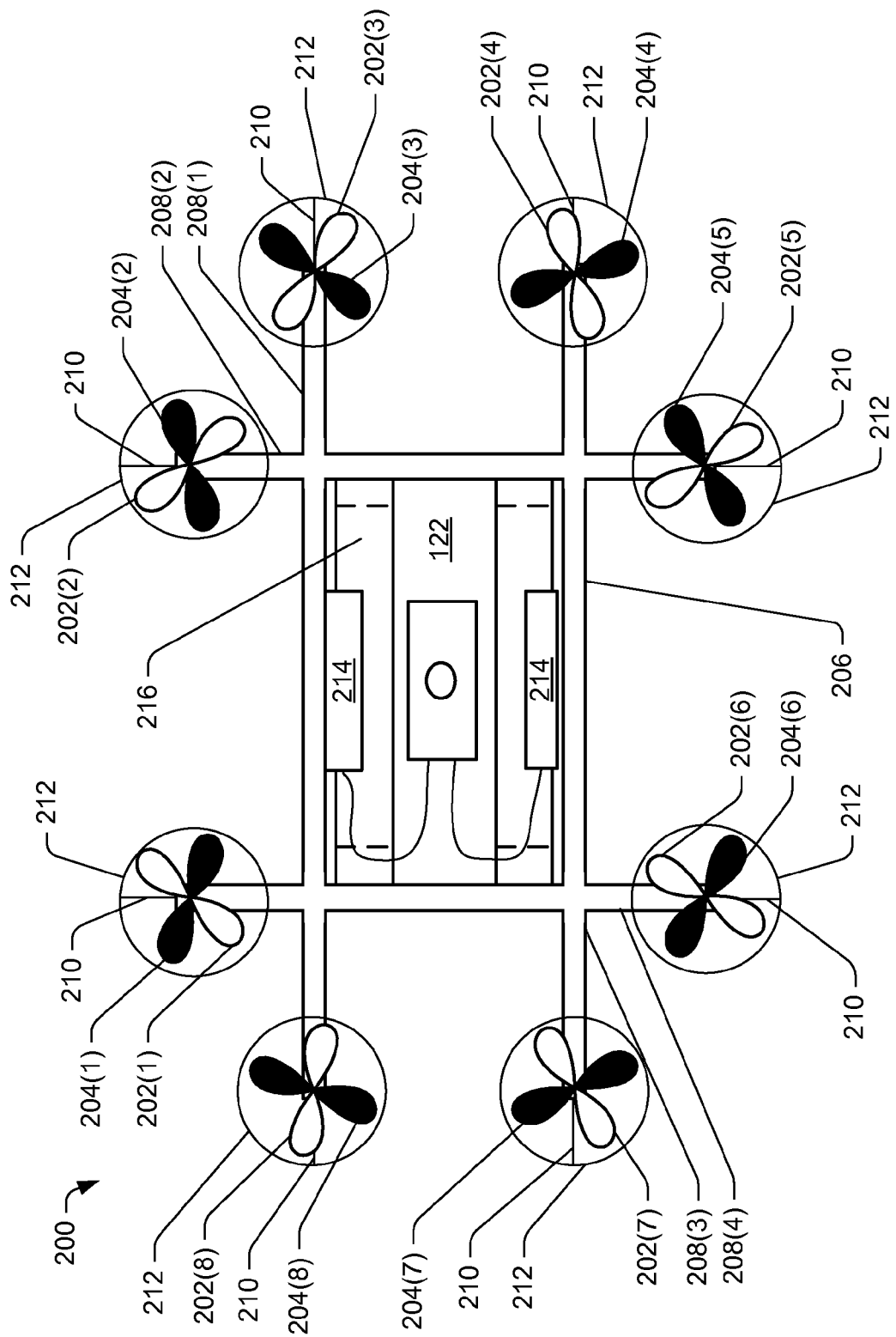
FIG. 2 is a top view of another example AAV that includes components used to implement noise cancellation, in accordance with some implementations.

FIG. 2 is a top view of another example automated aerial vehicle (AAV) 200 that includes components used to implement noise cancellation, in accordance with some implementations. As illustrated, the AAV 200 includes eight lower propellers 202-1, 202-2, 202-3, 202-4, 202-5, 202-6, 202-7, 202-8 that are respectively located below eight upper propellers 204-1, 204-2, 204-3, 204-4, 204-5, 204-6, 204-7, 204-8. The propellers 202 and 204 may be spaced about a frame 206 of the AAV 200. The propellers 202 and 204 may be any form of propeller (e.g., graphite, carbon fiber) and of a size sufficient to lift the AAV 200 and any inventory/payload engaged by the AAV 200 so that the AAV 200 can navigate through the air, for example, to deliver an inventory item to a location/destination. While this example includes eight pairs of propellers, in other implementations, more or fewer propellers may be utilized. Likewise, in some implementations, the propellers may be positioned at different locations on the AAV 200. In addition, alternative methods of upward and/or forward propulsion may be utilized. For example, fans, jets, turbojets, turbo fans, jet engines, and the like may be used to propel the AAV 200.

The frame 206 or body of the AAV 200 may likewise be of any suitable material, such as graphite, carbon fiber, plastic, composite, and/or aluminum. In this example, the frame 206 of the AAV 200 includes four structures (or spars) 208-1, 208-2, 208-3, and 208-4 arranged in a hash pattern with the structures intersecting and joined at approximately perpendicular angles. However, more or fewer structures may be included in the AAV 200. The structures may be rigid or substantially rigid to allow minimal flex during operation of the AAV 200. The structures may include a circular, oval, square, or polynomial cross section in some implementations. However, the structures 208 may be formed as open structures such as U-beams, I-beams, and fins. In this example, structures 208-1 and 208-3 are arranged parallel to one another and are approximately the same length. In some implementations, the structures 208-2 and 208-4 may be arranged parallel to one another, yet substantially perpendicular to structures 208-1 and 208-3. Some of the structures 208-2 and 208-4 may be approximately the same length or may be different lengths. In some implementations, all of the structures 208 may be of approximately the same length, while in other implementations, some or all of the structures 208 may be of different lengths. Likewise, the spacing between the two sets of structures may be approximately the same or different.

While the implementation illustrated in FIG. 2 includes four structures 208 that are joined to form the frame 206, in other implementations, there may be fewer or more components to the frame 206. For example, rather than four structures, in other implementations, the frame 206 of the AAV 200 may be configured to include six structures.

Although the structures 208 are shown as being straight or linear structures, the structures may include some curvature in some embodiments. The structures may be coupled to one another at other angles besides 90 degrees to position and/or support the propellers 202, 204 as discussed herein.

In some implementations, the AAV 200 may be configured for aerodynamics. For example, an aerodynamic housing may be included on the AAV 200 that encloses the AAV control system 122, one or more of the structures 208, the frame 206 and/or other components of the AAV 200. The housing may be made of any suitable material(s) such as graphite, carbon fiber, plastic, composite, aluminum, etc. Likewise, in some implementations, the location and/or the shape of the inventory (e.g., item or container) may be aerodynamically designed. For example, in some implementations, the inventory engagement mechanism may be configured such that, when the inventory is engaged, it is enclosed within the frame 206 and/or housing of the AAV 200 so that no additional drag is created during transport of the inventory by the AAV 200. In other implementations, the inventory may be shaped to reduce drag and provide a more aerodynamic design of the AAV 200 and the inventory. For example, if the inventory is a container and a portion of the container extends below the AAV 200 when engaged, the exposed portion of the container may have a curved shape.

The propellers 202, 204 and corresponding propeller motors are positioned at both ends of each structure 208. For inventory transport purposes, the propeller motors may be any form of motor capable of generating enough speed with the propellers to lift the AAV 200 and any engaged inventory thereby enabling aerial transport of the inventory. For example, the propeller motors may each be a FX-4006-13 740 kv multi rotor motor. The propeller motors may be any form of motor (e.g., permanent magnet, brushless, etc.).

Extending outward from each structure is a support arm 210 that is connected to a barrier 212. In this example, each barrier 212 is positioned around and attached to each propeller of the AAV 200 in such a manner that the motors and propellers 202, 204 are within the perimeter of the barrier 212. The barriers 212 may protect the propellers 202, 204 from damage and/or protect other objects from damage by preventing the propellers 202, 204 from engaging other objects. The barriers 212 may be plastic, rubber, etc., and may be round, oval, or any other shape.

Mounted to the frame 206 is the AAV control system 122. In this example, the AAV control system 122 is mounted centrally and on top of the frame 206. The AAV control system 122, as discussed in further detail below with respect to FIG. 9, controls the operation, routing, navigation, noise cancellation, communication, and the inventory engagement mechanism of the AAV 200.

Likewise, the AAV 200 includes one or more power modules 214. In this example, the AAV 200 includes two power modules 214 that are removably mounted to the frame 206. The power modules 214 for the AAV 200 may be in the form of battery power, solar power, gas power, super capacitor, fuel cell, alternative power generation source, or a combination thereof. For example, the power modules 214 may each be a 6000 mAh lithium-ion polymer battery (Li-poly, Li-Pol, LiPo, LIP, PLI or Lip) battery. The power module(s) 214 are coupled to and provide power for the AAV control system 122 and the propeller motors 202, 204.

As mentioned above, the AAV 200 may also include an inventory engagement mechanism 216. The inventory engagement mechanism 216 may be configured to engage and disengage items and/or containers that hold items. In this example, the inventory engagement mechanism 216 is positioned within a cavity of the frame 206 that is formed by the intersections of the structures 208. The inventory engagement mechanism 216 may be positioned beneath the AAV control system 122. In implementations with additional structures, the AAV 200 may include additional inventory engagement mechanisms and/or the inventory engagement mechanism 216 may be positioned in a different cavity within the frame 206. The inventory engagement mechanism 216 may be of any size sufficient to securely engage and disengage containers that contain inventory. In other implementations, the inventory engagement mechanism may operate as the container, containing the inventory item(s) to be delivered. The inventory engagement mechanism communicates with (via wired or wireless communication) and is controlled by the AAV control system 122.

While the implementations of the AAV 200 discussed herein utilize propellers 202, 204 to achieve and maintain flight, in other implementations, the AAV 200 may be configured in other manners. For example, the AAV 200 may include fixed wings and/or a combination of both propellers and fixed wings. For example, the AAV 200 may utilize one or more propellers to enable takeoff and landing and a fixed wing configuration or a combination wing and propeller configuration to sustain forward flight while the AAV 200 is airborne.

Figure 3:
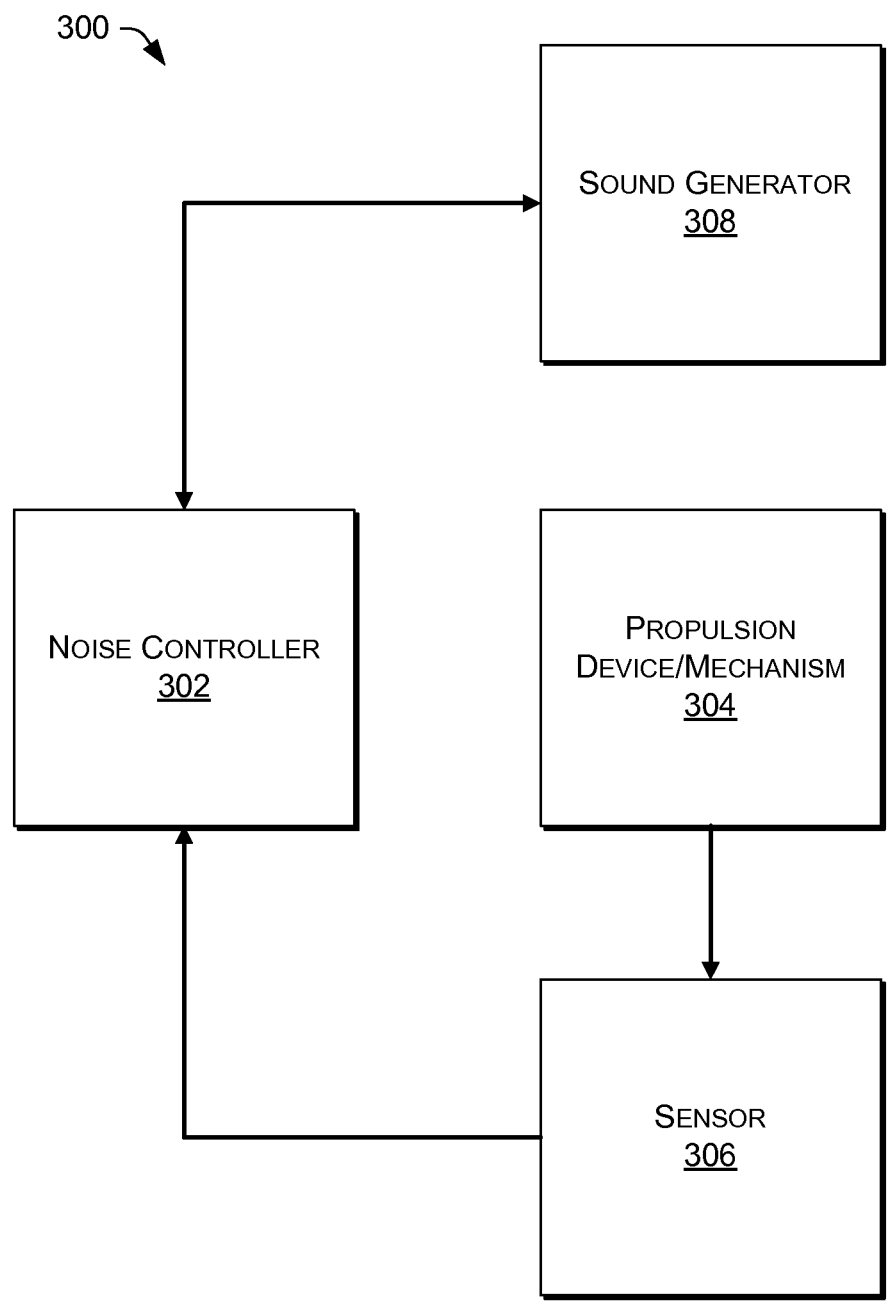
FIG. 3 is a block diagram illustrating example components of a vehicle that includes a noise controller, in accordance with some implementations.

FIG. 3 is a block diagram illustrating example components 300 of a vehicle that includes a noise controller 302, in accordance with some implementations. The vehicle components 300 may be components of an AAV or any other type of vehicle. For example, the vehicle components 300 can be included in any other type of aircraft (e.g., a passenger airplane), any type of land craft (e.g., an automobile), or any type of watercraft (e.g., a motor boat).

The vehicle components 300 may include a propulsion device or mechanism 304 operable to cause propulsion of the vehicle. In some instances, the propulsion device 304 may generate noise. A sensor 306 may be located near the propulsion device 304 to detect the noise generated by the propulsion device 304. The sensor 306 may be in direct or indirect communication with the noise controller 302. The noise controller 302 may receive from the sensor 306 a signal representing the noise detected by the sensor 306 (i.e., the noise generated by the propulsion device 304).

The noise controller 306 may also be in direct or indirect communication with a sound generator 308. In some cases, the sound generator 308 may be a mechanical device or system (e.g., the upper propeller 108 of FIG. 1). In other cases, the sound generator 308 may be an electrical or an electromechanical device or system (e.g., an audio speaker). The noise controller 302 may be configured to cause the sound generator 308 to substantially cancel the noise generated by the propulsion device 304. For example, the noise controller 302 may transmit a signal to the sound generator 308 that causes the sound generator 308 to produce anti-noise that destructively interferes with the noise generated by the propulsion device 304.

Figure 4:
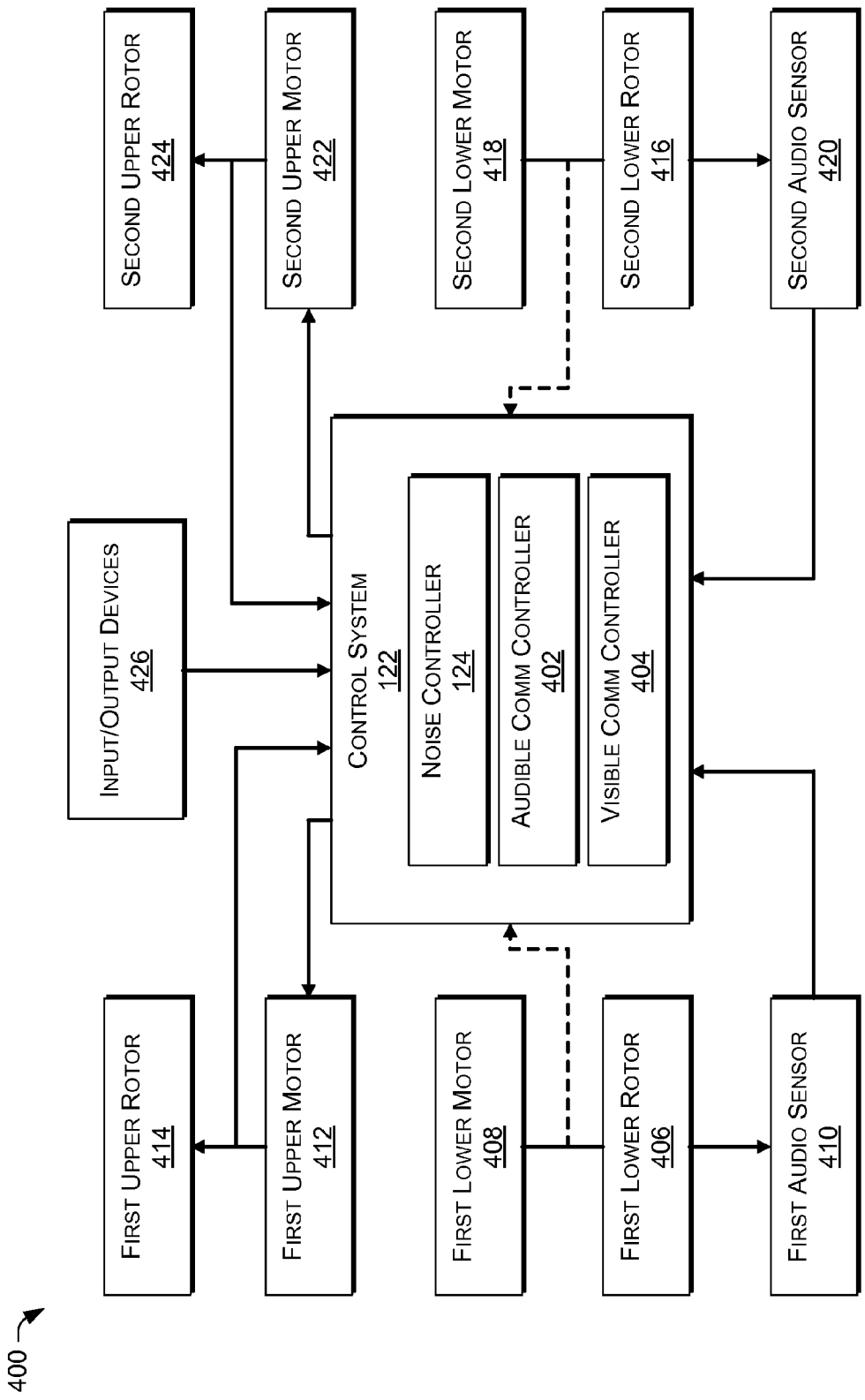
FIG. 4 is a block diagram illustrating example components of an AAV with a control system that includes one or more of a noise controller, an audible communication controller, or a visible communication controller, in accordance with some implementations.

FIG. 4 is a block diagram illustrating example components 400 of an AAV with a control system 122 that includes one or more of a noise controller 124, an audible communication controller 402, or a visible communication controller 404, in accordance with some implementations.

The AAV components 400 may include a first lower rotor 406 that is driven by a first lower motor 408. A first audio sensor 410 may be located near the first lower rotor 406 and configured to detect noise substantially generated by the first lower rotor 406. In some cases, the first audio sensor 410 may additionally or alternatively detect ambient noise from a noise source that is not the first lower rotor 406.

The noise controller 124 may be in direct or indirect communication with the first audio sensor 410 and a first upper motor 412 that drives rotation of the first upper rotor 414. In various implementations, the noise controller 124 may receive from the first audio sensor 410 a signal representing the noise detected by the first audio sensor 410. Based at least in part on the signal received from the first audio sensor 410, the noise controller 124 may determine how to modulate the rotational speed of the first upper rotor 414 such that the first upper rotor 414 produces sound that substantially cancels the noise generated by at least the first lower rotor 406.

In some implementations, the noise controller 124 may receive a signal representing the rotational speed of the first lower rotor 406. In such cases, the noise controller 124 may interpret or translate the rotational speed of the first lower rotor 406 into a representation of noise generated by the first lower rotor 406. Accordingly, the noise controller 124 may determine how to modulate rotational speed of the first upper rotor 414 based at least in part on the received signal representing the rotational speed of the first lower rotor 406.

In various implementations, the AAV components 400 may also include a second lower rotor 416, a second lower motor 418, a second audio sensor 420, a second upper motor 422, and a second upper rotor 424 that, in some cases, are functionally similar to the first lower rotor 406, the first lower motor 408, the first audio sensor 410, the first upper motor 412, and the first upper rotor 414, respectively. It should be understood that the AAV components 400 may include additional rotors, motors, sensors, other components, or any combination thereof, which may or may not be functionally similar to one or more of the AAV components 400 depicted in FIG. 4.

In some cases, the noise controller 124 may receive a plurality of signals representing noise generated by different rotors. For instance, the noise controller 124 may receive a first signal from the first audio sensor 410 that represents first noise generated by the first lower rotor 406. The noise controller 124 may also receive a second signal from the second audio sensor 420 that represents second noise generated by the second lower rotor 416. The noise controller 124 may determine a global ambient noise based at least in part on noise detected by multiple sensors, such as the first noise and the second noise detected by the first audio sensor 410 and the second audio sensor 420, respectively. In some cases, one or more of the first noise, the second noise, or the determined ambient noise may include noise detected in the ambient environment from one or more noise sources other than propellers of the AAV (e.g., noise from weather, other aircraft, birds, construction, etc.).

In some implementations, the AAV control system 122 may include an audible communication controller 402 that causes one or multiple propellers to generate audible communications. In some cases, the audible communication controller 402 may receive various input parameters, such as parameters received from one or more of the first audio sensor 410, the second audio sensor 420, or input/output devices 426.

Input/output devices 426 may, in some implementations, include one or more audio sensors, image capture devices, thermal sensors, infrared sensors, time of flight sensors, accelerometers, pressure sensors, weather sensors, airflow sensors, etc. Multiple input/output devices 426 may be present and controlled by the AAV control system 122. One or more of these or other sensors may be utilized to assist in landings as well as avoiding obstacles during flight. Additionally or alternatively, one or more of these or other sensors may be utilized to detect a presence and/or a location (relative or absolute) of living beings, such as humans or animals.

The audible communication controller 402 may determine that one or more of the received input parameters satisfy a condition that corresponds to an audible communication that is to be communicated. For example, the audible communication controller 402 may receive one or more input parameters (e.g., a video signal from a camera) that indicate a location of a person. The audible communication controller 402 may determine that the location of the person indicated by the received one or more input parameters satisfies a flight condition, e.g., a flight condition associated with the person being dangerously near the landing path of the AAV. In this example, satisfaction of the flight condition may correspond to a warning message audible communication, such as a "Watch out!" type of warning message.

In some implementations, the audible communication controller 402 may determine how to modulate rotational speed of one or multiple rotors to cause the rotor(s) to produce a series of sounds that are audibly perceptible as the audible communication (e.g., "Hello!", "Watch out!", "Incoming!", "Get out of the way!", etc.). In some implementations, the series of sounds produced by the rotor(s) while rotating at the modulated rotational speeds may be synthesized speech.

Additionally or alternatively, the series of sounds produced by the rotor(s) may be at audio frequencies corresponding to pitches intended to annoy or scare away animals. For example, the audible communication controller 402 may determine that the location of an animal (e.g., a bird) indicated by the received one or more input parameters satisfies a flight condition associated with the animal being dangerously near the flight path of the AAV. In this example, satisfaction of the flight condition may correspond to an audible communication perceptible as one or more sounds predetermined to scare away the animal. The sounds may, in some instances, be tailored to particular types of animals. That is, sounds produced as an audible communication directed to one type of animal may be different than sounds produced as an audible communication direct to another type of animal.

In some implementations, a history of received input parameters provided by the input/output devices 426 and/or data provided by any other source may be utilized by the audible communication controller 402 to infer that a flight condition is satisfied. For example, the audible communication controller 402 may, based on a history of received input parameters, infer that a portion of a flight path of the AAV is associated with a high traffic of birds. For that portion of the flight path, the audible communication controller 402 may cause the rotor(s) to generate an audible communication based at least in part on the history of received input parameters/data.

In various cases, rotational speed(s) of the rotor(s) may be modulated at a rate ranging from about 9 kHz to about 11 kHz to generate an audible communication. For instance, in some implementations, the rate of modulation of the rotational speed of a rotor may be approximately 10 kHz.

In some cases, one or more components of the control system 122 may include a software-defined radio (SDR) component or the like capable of generating signals at audio frequencies of approximately 10 kHz or higher. The SDR component (or the like) may be utilized, for example, by the audible communication controller 402 or the noise controller 124 to generate an output signal that modulates the speed of the rotor(s). That is, instead of audio speakers being connected to a SDR, the rotor(s) may act as audio speakers connected to the SDR component (or the like).

Additionally or alternatively, the AAV control system 122 may include a visible communication controller 404 that causes one or multiple rotors to generate visible communications. For example, the visible communication controller 404 may receive various input parameters, such as parameters received from one or more of the first audio sensor 410, the second audio sensor 420, or input/output devices 426.

The visible communication controller 404 may determine that one or more of the received input parameters satisfy a condition that corresponds to a visible communication that is to be communicated. For example, the visible communication controller 404 may receive one or more input parameters (e.g., a video signal from a camera) that indicate a location of a person. The visible communication controller 404 may determine that the location of the person indicated by the received one or more input parameters satisfies a flight condition, e.g., a flight condition associated with the person being near, but not dangerously near, the landing path of the AAV. In this example, satisfaction of the flight condition may correspond to a greeting message visible communication, such as the "HI" greeting message illustrated in FIG. 5 and described below.

In various implementations, to generate the visible communication, light sources [e.g., light-emitting diodes (LEDs)] may be coupled to one or multiple rotor(s). The light sources may be intermittently illuminated in a synchronized manner while the rotor(s) are rotating to generate patterns that are visibly perceptible as the visible communication.

In some cases, the visible communications may include multiple words that together form phrases or sentences. Individual rotors may generate one or more of: a single letter or symbol of the visible communication, multiple letters of the visible communication, multiple symbols of the visible communication, etc. Multiple rotors may cooperatively generate one or more of: a single letter or symbol of the visible communication, multiple letters of the visible communication, multiple symbols of the visible communication, etc. It should be understood, however, that the rotors in conjunction with the light sources coupled thereto may be caused to generate a visible communication in any suitable manner.

Figure 5:
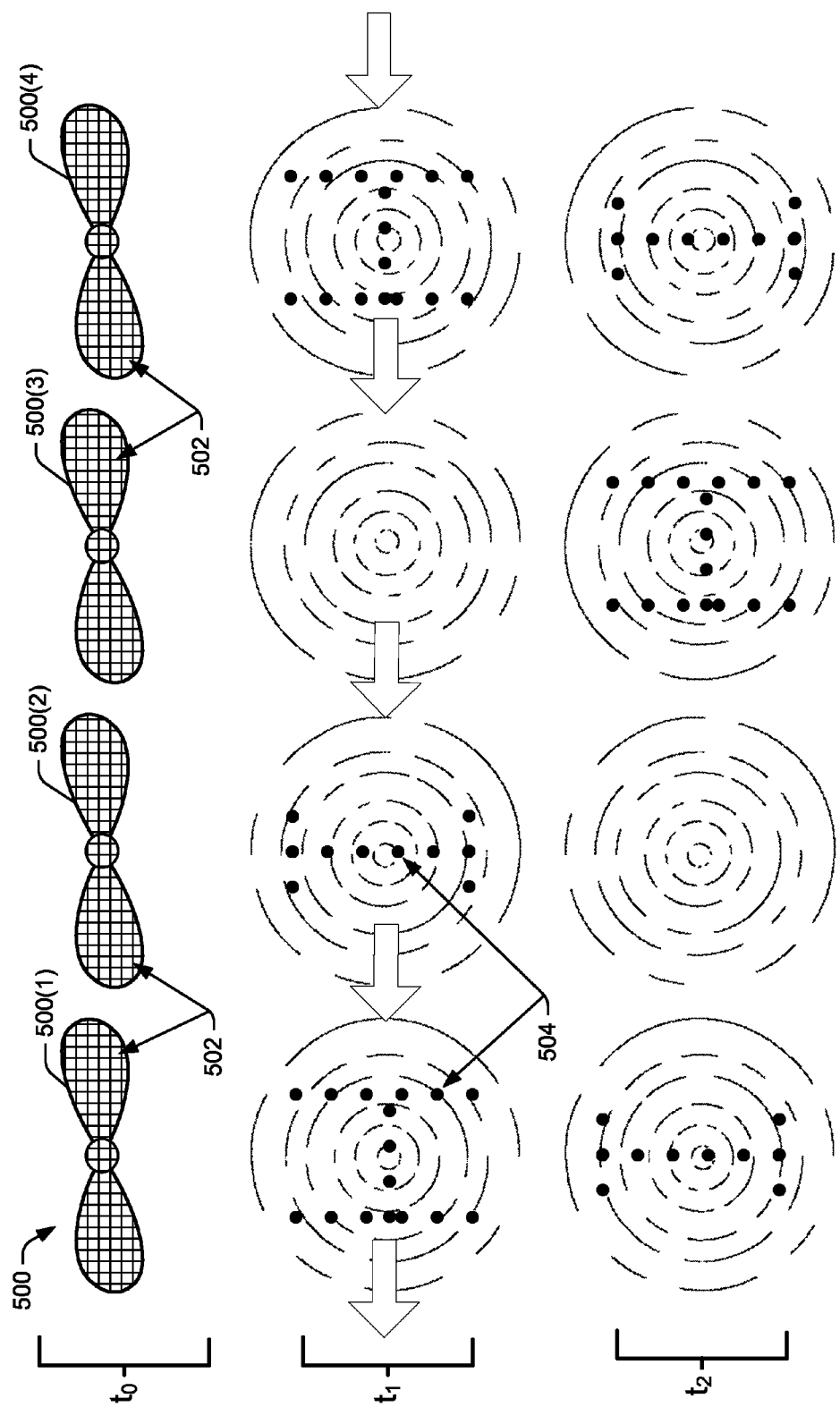
FIG. 5 is an illustrative diagram of example AAV propellers with light sources illuminated to generate a visible communication, in accordance with some implementations.

FIG. 5 is an illustrative diagram of example AAV propellers 500 with light sources 502 that are illuminated to generate a visible communication, in accordance with some implementations. Light sources 502 may be coupled to the propellers 500. In some implementations, the light sources 502 may be light-emitting diodes (LEDs). However, in other implementations, the light sources 502 may be any other type of light source or any combination of different types of light sources.

In the illustrated implementation, movement of the propellers 500 and illumination activity of the light sources 502 are depicted at three different snapshots taken at times t0, t1, t2. At time t0, the propellers 500 are indicated as standing still and the light sources 502 are indicated as not being illuminated. At time t1, the propellers 500 are indicated as rotating, and some of the light sources 502 are indicated as a pattern of illuminated light sources 502 that are visibly perceptible as "HI" 504, with each letter of the visible communication being implemented by light sources 502 coupled to an individual propeller. That is, in this example, light sources 502 coupled to the first propeller 500-1 are illuminated to implement the "H" of a first instance of the "HI" visible communication, and light sources 502 coupled to the second propeller 500-2 are illuminated to implement the "I" of the first instance of the "HI" visible communication.

None of the light sources 502 coupled to the third propeller 500-3 are indicated as illuminated at time t1. In some instances, such an absence of illumination may indicate a space between words, phrases, and/or sentences of a visible communication. Light sources 502 coupled to the fourth propeller 500-4 implement an "H" of a second instance of the "HI" visible communication. At time t1, the "I" of the second instance of the "HI" visible communication is yet to be generated.

At time t2, the propellers 500 are indicated as rotating, and some of the light sources 502 are indicated as a pattern of illuminated light sources 502 that are visibly perceptible as "HI" 504. As compared to time t1, the characters representing the "HI" visible communication are indicated as having shifted or scrolled one position (e.g., one propeller) to the left. That is, at time t2 of this example, light sources 502 coupled to the first propeller 500-1 are now illuminated to implement the "I" of a first instance of the "HI" visible communication (the "H" of the first instance of the "HI" visible communication is no longer visible). None of the light sources 502 coupled to the second propeller 500-2 are indicated as illuminated at time t2. Light sources 502 coupled to the third and fourth propellers 500-3, 500-4 are illuminated to implement the "H" and the "I", respectively, of the second instance of the "HI" visible communication. It should be understood that the example illustrated in FIG. 5 is just one non-limiting example according to some implementations. Numerous other implementations, variations, and configurations will be apparent to those of skill in the art in view of the disclosure herein.

Figure 6:
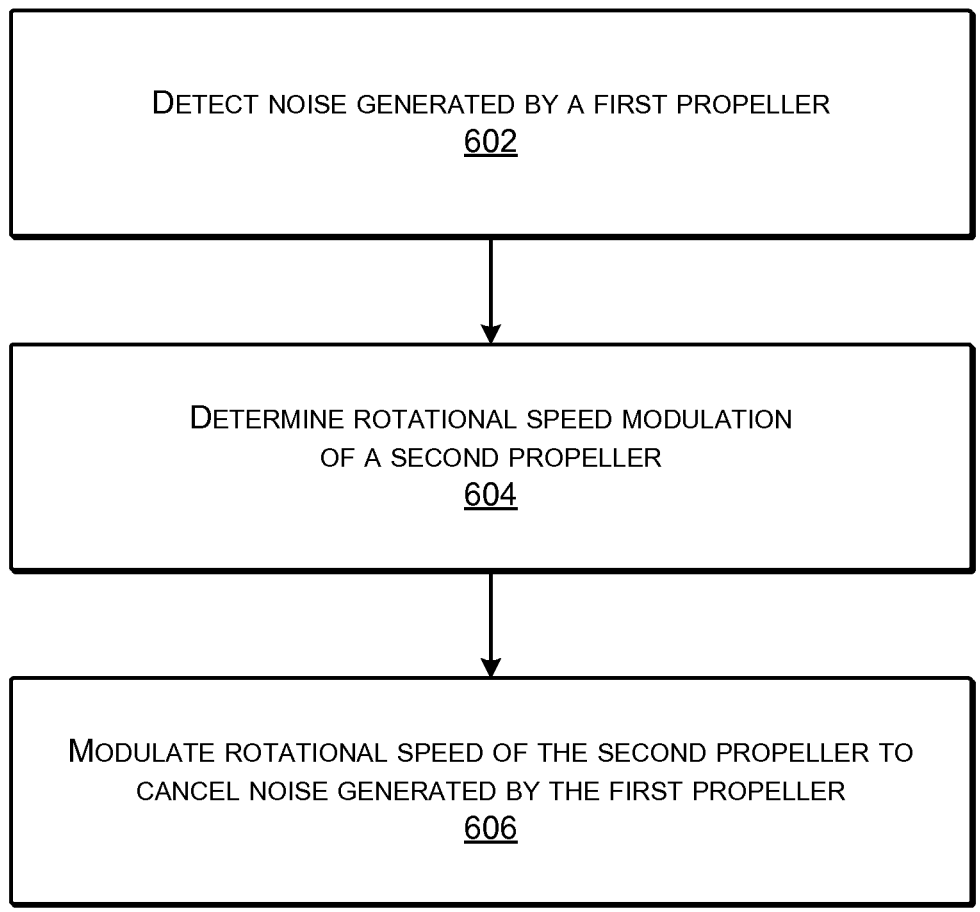
FIG. 6 is an example flow diagram illustrating an example noise canceling process, in accordance with some implementations.
Figure 7:
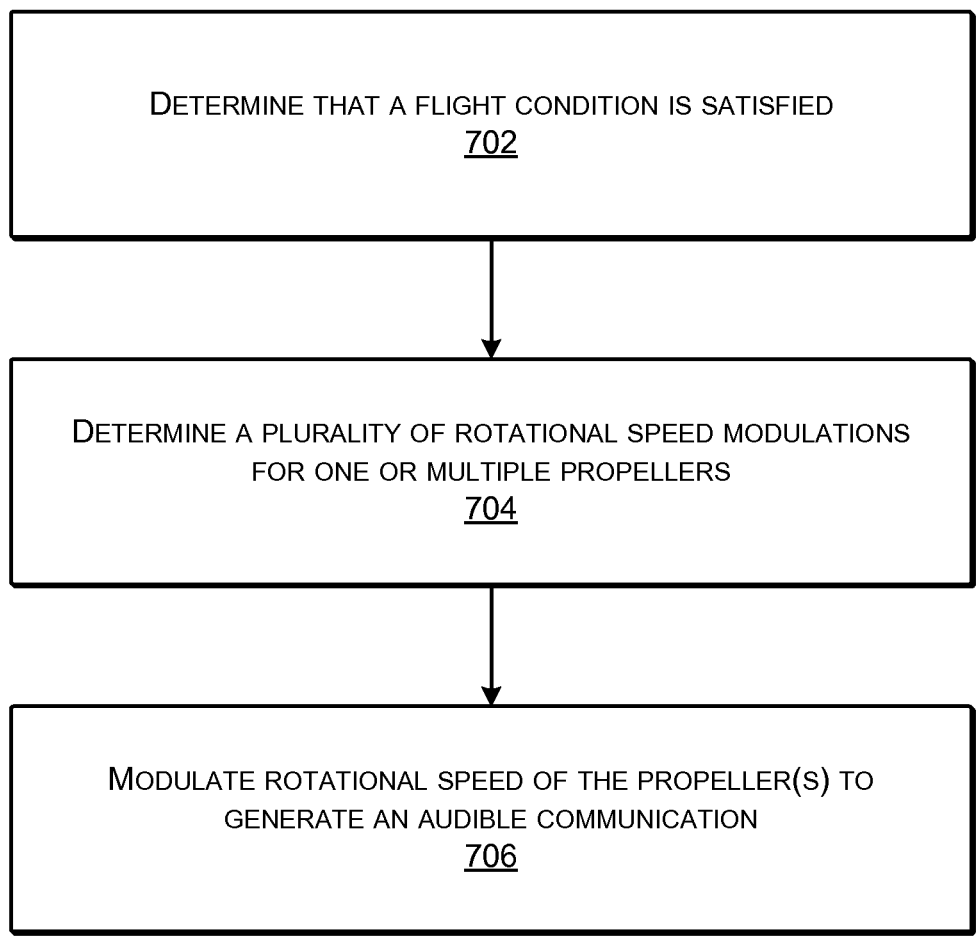
FIG. 7 is an example flow diagram illustrating an example process for generating an audible communication, in accordance with some implementations.
Figure 8:
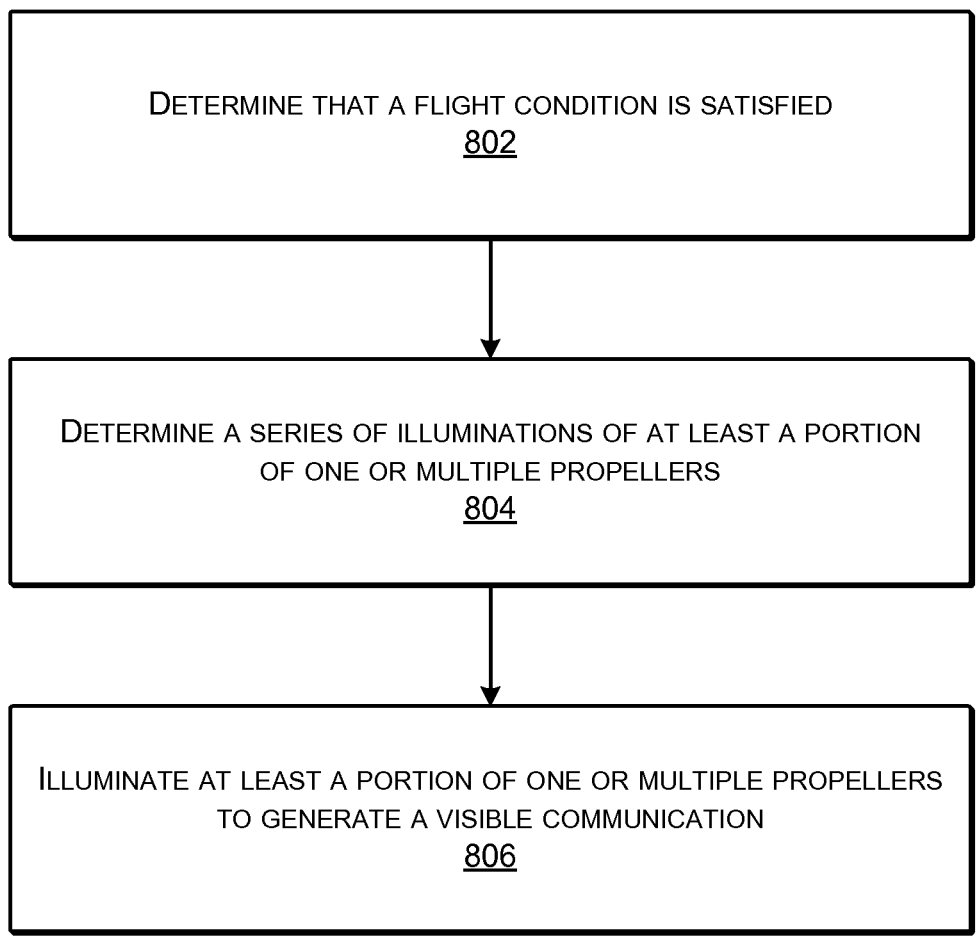
FIG. 8 is an example flow diagram illustrating an example process for generating a visible communication, in accordance with some implementations.

FIGS. 6-8 are example flow diagrams illustrating example processes 600, 700, and 800, in accordance with some implementations. These processes 600, 700, and 800 are illustrated as logical flow diagrams, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process, and not all of the operations are necessarily required.

FIG. 6 is an example flow diagram illustrating an example noise canceling process 600, in accordance with some implementations. At block 602, the process 600 includes detecting noise generated by a first propeller. For example, an AAV may include one or more audio sensors disposed proximate the first propeller to detect the noise generated by the first propeller. In some cases, the AAV may also include a control system that receives from the one or more audio sensors a representation of the noise generated by the first propeller.

At block 604, the process 600 includes determining rotational speed modulation of a second propeller. For example, the control system of the AAV may determine one or more modulations of rotational speed of the second propeller that would cause the second propeller to produce a sound that cancels the noise generated by the first propeller.

At block 606, the process 600 includes modulating rotational speed of the second propeller to cancel noise generated by the first propeller. For example, the control system of the AAV may cause a motor that drives rotation of the second propeller to modulate the rotational speed of the second propeller. While rotating at the modulated rotational speed, the second propeller may produce anti-noise that cancels the noise generated by the first propeller.

FIG. 7 is an example flow diagram illustrating an example process 700 for generating an audible communication, in accordance with some implementations. At block 702, the process 700 includes determining that a flight condition is satisfied. For instance, the control system of the AAV may determine that one or more received input parameters satisfy a condition that corresponds to generating an audible communication.

At block 704, the process 700 includes determining a plurality of rotational speed modulations for one or multiple propellers. In some instances, for example, the control system of the AAV may determine a plurality of rotational speed modulations that cause the propeller(s) to generate a series of sounds that correspond to an audible communication.

At block 706, the process 700 includes modulating rotational speed of the propeller(s) to generate an audible communication. For example, the control system of the AAV may cause the propeller(s) to generate a series of sounds that are audibly perceptible as an audible communication, such as a warning message (e.g., "Watch out!").

FIG. 8 is an example flow diagram illustrating an example process 800 for generating a visible communication, in accordance with some implementations. At 802, the process 800 includes determining that a flight condition is satisfied. For instance, the control system of the AAV may determine that one or more received input parameters satisfy a condition that corresponds to generating a visible communication.

At block 804, the process 800 includes determining a series of illuminations of at least a portion of one or multiple propellers. For example, light sources may be coupled to the propeller(s), and the control system of the AAV may determine a series of illuminations of the light sources that cooperatively produce a visible communication. In some cases, the light sources may be light-emitting diodes (LEDs). Determining a series of illuminations that implement a visible communication may include, for example, determining a first LED of a plurality of LEDs to illuminate at a first time, and determining a second LED of the plurality of LEDs to illuminate at a second time that is different than the first time.

At block 806, the process 800 includes illuminating at least a portion of one or multiple propellers to generate a visible communication. In some implementations, this may include illuminating at least a portion of a first propeller at a first time, and illuminating at least a portion of a second propeller at a second time that is different than the first time. Additionally or alternatively, in some cases, illuminating at least a portion of one or multiple propellers to generate a visible communication may include illuminating a first LED that is coupled to a first propeller of the multiple propellers at a first time, and illuminating a second LED that is coupled to a second propeller of the multiple propellers at a second time that is different than the first time.

Figure 9:
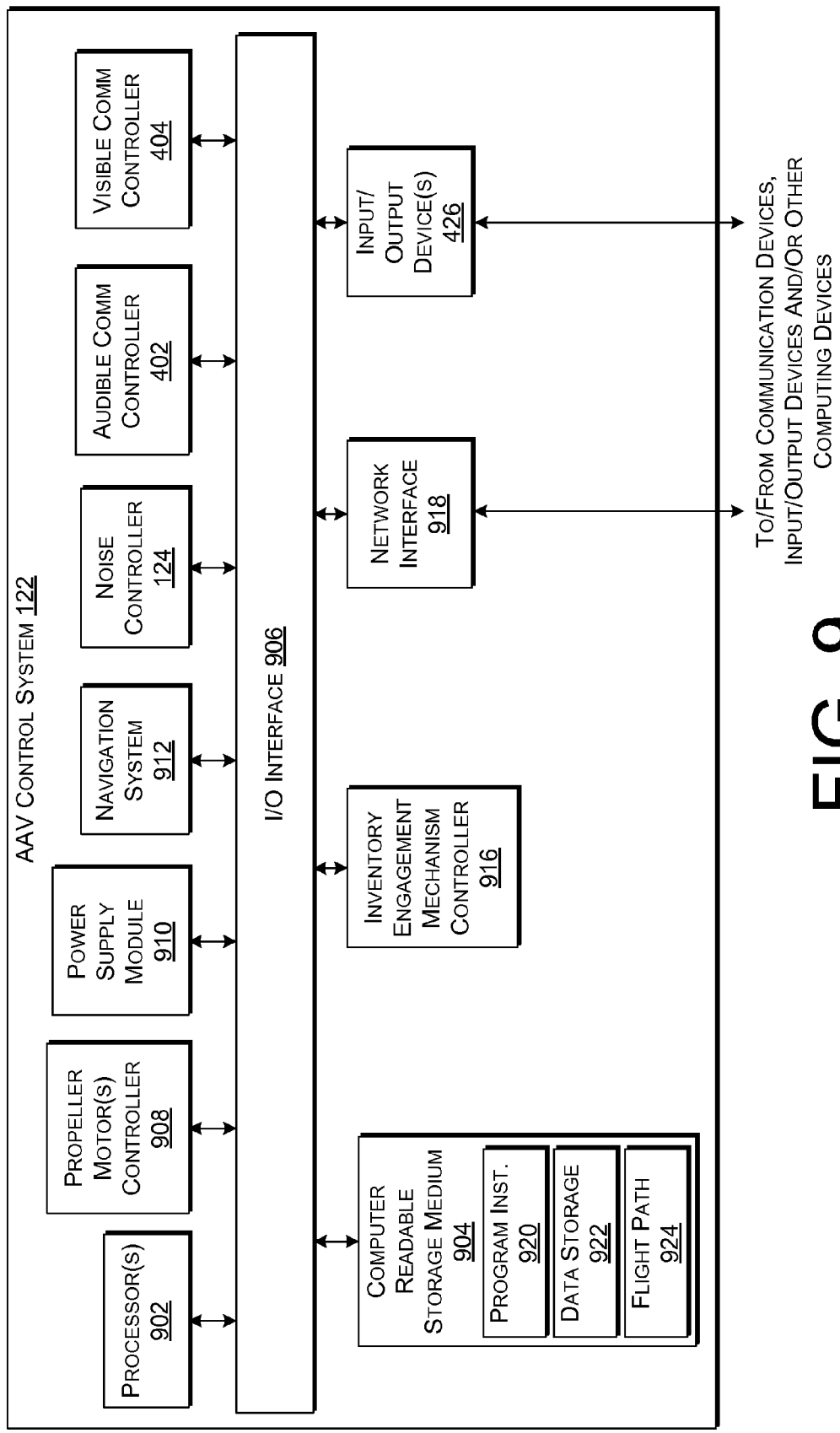
FIG. 9 is a block diagram of an illustrative computing architecture of the AAV, in accordance with some implementations.

FIG. 9 is a block diagram of an illustrative computing architecture of the AAV 100, 200. In various examples, the block diagram may be illustrative of one or more aspects of the AAV control system 122 that may be used to implement the various systems, devices, and techniques discussed above. In the illustrated implementation, the AAV control system 122 includes one or more processors 902, coupled to a non-transitory computer readable storage medium 904 via an input/output (I/O) interface 906. The AAV control system 122 may also include a propeller motor controller 908, power supply module 910 and/or a navigation system 912. The AAV control system 122 further includes a noise controller 124, an audible communication controller 402, a visible communication controller 404, an inventory engagement mechanism controller 916, a network interface 918, and one or more input/output devices 426.

In various implementations, the AAV control system 122 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 904 may be configured to store executable instructions, data, flight paths and/or data items accessible by the processor(s) 902. In various implementations, the non-transitory computer readable storage medium 904 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 904 as program instructions 920, data storage 922, and flight path data 924, respectively. In other implementations, program instructions, data and/or flight paths may be received, sent or stored upon different types of computer-accessible media, such as non-transitory media, or on similar media separate from the non-transitory computer readable storage medium 904 or the AAV control system 122. Generally, a non-transitory, computer readable storage medium may include storage media or memory media such as flash memory (e.g., solid state memory), magnetic or optical media (e.g., disk) coupled to the AAV control system 122 via the I/O interface 906. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 918.

The propeller motor(s) controller 908 communicates with the navigation system 912 and adjusts the power of each propeller motor to guide the AAV along a determined flight path. The power supply module 910 may control the charging and any switching functions associated with one or more power modules (e.g., batteries) of the AAV, such as the power sources 214. The navigation system 912 may include a GPS or other similar system that can be used to navigate the AAV to and/or from a location.

The noise controller 124 may operate to cause noise cancellation as described herein. For example, the noise controller 124 may cause one or more propellers of the AAV to produce anti-noise that cancels noise generated by one or more other propellers.

The audible communication controller 402 may operate to cause generation of audible communications as described herein. For example, the audible communication controller 402 may cause modulation of rotational frequency of one or more propellers to cause the propeller(s) to generate a series of sounds that are audibly perceptible as an audible communication.

The visible communication controller 404 may operate to cause generation of visible communications as described herein. For example, the visible communication controller 404 may cause intermittent illumination of light sources that are coupled to one or more propellers to generate a pattern that is visibly perceptible as a visible communication.

The inventory engagement mechanism controller 916 communicates with the motor(s) (e.g., a servo motor) used to engage and/or disengage inventory. For example, when the AAV is positioned over a level surface at a delivery location, the inventory engagement mechanism controller 916 may provide an instruction to a motor that controls the inventory engagement mechanism to release the inventory.

The network interface 918 may be configured to allow data to be exchanged between the AAV control system 122, other devices attached to a network, such as other computer systems, and/or with AAV control systems of other AAVs. For example, the network interface 918 may enable wireless communication between numerous AAVs. In various implementations, the network interface 918 may support communication via wireless general data networks, such as a Wi-Fi network. For example, the network interface 918 may support communication via telecommunications networks such as cellular communication networks, satellite networks, and the like.

Input/output devices 426 may, in some implementations, include one or more displays, audio sensors, image capture devices, thermal sensors, infrared sensors, time of flight sensors, accelerometers, pressure sensors, weather sensors, airflow sensors, etc. Multiple input/output devices 426 may be present and controlled by the AAV control system 122. One or more of these or other sensors may be utilized to assist in landings as well as avoiding obstacles during flight. Additionally or alternatively, one or more of these or other sensors may be utilized to detect a presence and/or a location (relative or absolute) of living beings, such as humans or animals.

As shown in FIG. 9, the memory 904 may include program instructions 920 which may be configured to implement the example processes and/or sub-processes described above. The data storage 922 may include various data stores for maintaining data items that may be provided for determining flight paths, causing noise cancellation, causing generation of audible communications, causing generation of visible communications, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AAV control system 122 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AAV control system 122 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AAV control system 122. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the AAV control system 122 may be transmitted to the AAV control system 122 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other AAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An automated aerial vehicle (AAV) comprising:
   a plurality of propellers that include:
      a first propeller operable to rotate in a first rotational direction to cause lift of the AAV, the first propeller generating noise sound waves while rotating; and
      a second propeller operable to rotate in a second rotational direction that is opposite the first rotational direction, the second propeller being located in a same plane as the first propeller and having a different axis of rotation than the first propeller;
   a microphone to detect the noise sound waves generated by at least the first propeller;

a first propeller motor that drives rotation of the first propeller;
a second propeller motor that drives rotation of the second propeller; and
a control system in communication with at least the microphone, the first propeller, and the second propeller motor, the control system configured to:
receive a signal representing the detected noise sound waves;
cause the propeller motor to modulate rotational speed of the second propeller such that the second propeller generates anti-noise sound waves that are in anti-phase with the noise sound waves generated by the first propeller and that have a same amplitude as the noise sound waves, the anti-noise sound waves substantially canceling the noise sound waves;
detect that an object is in a flight path of the AAV;
determine a plurality of rotational speed modulations that cause at least one propeller of the plurality of propellers to generate a series of sounds that correspond to an audible communication; and
modulate rotational speed of the at least one propeller based on the determined plurality of rotational speed modulations to communicate the audible communication.

2. The AAV of claim 1, further comprising a plurality of light-emitting diodes (LEDs), individual LEDs of the plurality of LEDs being coupled to a propeller of the plurality of propellers, the control system further configured to:
determine that a person is in a flight path of the AAV;
determine a series of LED illuminations that correspond to a visible communication, wherein determining the series of LED illuminations includes:
determining a first LED of the plurality of LEDs to illuminate at a first time; and
determining a second LED of the plurality of LEDs to illuminate at a second time, the second time being different than the first time; and
cause illumination of the plurality of LEDs based on the determined series of LED illuminations to communicate the visible communication.

3. The AAV of claim 2, wherein the first LED is coupled to the first propeller of the plurality of propellers and the second LED is coupled to the second propeller of the plurality of propellers.

4. A vehicle comprising:
a plurality of rotors that include:
a first rotor operable to rotate about a first center of rotation and cause propulsion of the vehicle, the rotor generating noise while rotating; and
a second rotor operable to rotate about a second center of rotation; and
a control system configured to:
receive a signal representing one or more operational characteristics of the first rotor;
cause modulation of at least one of the second rotor or a sound generator to produce sound that substantially cancels the noise generated by the first rotor, the modulation being determined based at least in part on the received signal; and
cause modulation of at least one of the plurality of rotors such that the at least one of the plurality of rotors generates an audible communication.

5. The vehicle of claim 4, wherein:
the first rotor rotates in a first rotational direction; and
the second rotor rotates in a second rotational direction that is opposite the first rotational direction.

6. The vehicle of claim 4, further comprising an audio sensor that is configured to detect the noise generated by the first rotor, and wherein the control system is configured to receive a signal representing one or more operational characteristics of the first rotor comprises the control system being configured to receive, from the audio sensor, a signal representing the noise.

7. The vehicle of claim 4, wherein:
the first rotor is operable to rotate in a first rotational direction;
the second rotor is operable to rotate in a second rotational direction that is opposite the first rotational direction; and
the control system being configured to cause modulation of at least one of the second rotor or the sound generator comprises the control system being configured to cause modulation of rotational speed of the second rotor to modulate the sound produced by the second rotor.

8. The vehicle of claim 7, further comprising an audio sensor that is configured to detect the noise generated by the first rotor, and wherein
the control system being configured to receive a signal representing one or more operational characteristics of the first rotor comprises the control system being configured to receive, from the audio sensor, a signal representing the detected noise.

9. The vehicle of claim 4, wherein the control system being configured to cause modulation of the sound generator comprises the control system being configured to cause modulation of the sound generator at a rate of modulation of approximately 10 kHz or higher.

10. The vehicle of claim 4, wherein the vehicle comprises an automated aerial vehicle (AAV).

11. The vehicle of claim 4, wherein the one or more operational characteristics of the first rotor includes rotational speed of the first rotor.

12. The vehicle of claim 4, wherein the sound generator comprises an audio speaker.

13. The vehicle of claim 4, further comprising a plurality of audio sensors configured to detect ambient sound outside the vehicle, wherein:
a first audio sensor of the plurality of audio sensors is disposed proximate the first rotor of the plurality of rotors;
a second audio sensor of the plurality of audio sensors is disposed proximate the second rotor of the plurality of rotors; and
the control system is further configured to cause modulation of the at least one of the plurality of rotors such that the at least one of the plurality of rotors generates the audible communication includes:
receive a first signal from the first audio sensor, the first signal representing first detected ambient noise that includes noise generated by the first rotor;
receive a second signal from the second audio sensor, the second signal representing second detected ambient noise that includes noise generated by the second rotor;
determine a global ambient noise based at least in part on the first received signal and the second received signal;
determine a plurality of modulations of rotational speed of one or more rotors of the plurality of rotors, the plurality of modulations corresponding to the audible communication; and cause modulation of rotational speed of the one or more rotors of the plurality of rotors based on the determined plurality of modulations such that the one or more rotors produce a series of sounds that provide the audible communication, the audible communication being perceptible from outside the vehicle.

14. A method comprising:

detecting noise generated by a first propeller of a plurality of propellers of an aerial vehicle;

modulating, based at least in part on the detected noise, rotational speed of a second propeller of the plurality of propellers of the aerial vehicle such that the second propeller produces sound that substantially cancels the noise generated by the first propeller, wherein the first propeller and the second propeller are located substantially in a same plane and have different axes of rotation; and illuminating at least a portion of one or more propellers of the plurality of propellers to produce a visible communication.

15. The method of claim 14, wherein the detecting noise comprises detecting, via a first audio sensor, first noise that is generated by the first propeller of the plurality of propellers, the method further comprising detecting, via a second audio sensor, second noise that is generated by a third propeller of the plurality of propellers.

16. The method of claim 15, further comprising:

determining a global ambient noise based at least in part on the detected first noise and the detected second noise; and modulating rotational speed of one or more propellers of the plurality of propellers based at least in part on the determined global ambient noise.

17. The method of claim 14, further comprising modulating rotational speed of one or more propellers of the plurality of propellers to cause the one or more propellers to produce a series of sounds corresponding to an audible communication.

18. The method of claim 14, wherein the illuminating at least the portion of the one or more propellers of the plurality of propellers to produce the visible communication comprises:

illuminating at least a first portion of the first propeller at a first time; and illuminating at least a second portion of the second propeller at a second time.

19. The method of claim 18, wherein the second time is different than the first time.

20. The method of claim 14, wherein multiple light-emitting diodes (LEDs) are coupled to individual propellers of the plurality of propellers, and wherein the illuminating at least the portion of the one or more propellers of the plurality of propellers to produce the visible communication comprises:

illuminating a first LED that is coupled to the first propeller of the plurality of propellers at a first time; and illuminating a second LED that is coupled to the second propeller of the plurality of propellers at a second time, the second time being different than the first time.

* * * * *